United States Patent
Okada et al.

(10) Patent No.: US 7,906,877 B2
(45) Date of Patent: Mar. 15, 2011

(54) LINEAR MOTOR DEVICE AND MACHINE TOOL HAVING THE SAME MOUNTED THEREON

(75) Inventors: Takuya Okada, Kyoto (JP); Noritaka Ishiyama, Mogami-machi (JP)

(73) Assignees: Murata Machinery Ltd., Kyoto-shi, Kyoto (JP); GMC Hillstone Co., Ltd., Mogami-gun, Yamagata (JP)

( * ) Notice: Subject to any disclaimer, the term of this patent is extended or adjusted under 35 U.S.C. 154(b) by 76 days.

(21) Appl. No.: 11/902,804

(22) Filed: Sep. 25, 2007

(65) Prior Publication Data

US 2008/0079319 A1    Apr. 3, 2008

(30) Foreign Application Priority Data

Sep. 28, 2006    (JP) .................................. 2006-264353

(51) Int. Cl.
*H02K 33/00* (2006.01)
*H02K 35/00* (2006.01)
*H02K 41/00* (2006.01)
*H02K 41/02* (2006.01)

(52) U.S. Cl. ............ 310/15; 310/12.01; 310/14; 310/39; 310/71; 310/89; 310/101; 310/144

(58) Field of Classification Search ............... 310/12–39, 310/71, 89, 101, 12.01; 100/144; *H02K 41/00, H02K 41/02, 33/00, 35/00*
See application file for complete search history.

(56) References Cited

U.S. PATENT DOCUMENTS

| | | | | |
|---|---|---|---|---|
| 4,349,757 A | * | 9/1982 | Bhate | 360/15 |
| 4,363,980 A | * | 12/1982 | Petersen | 310/15 |
| 4,870,306 A | * | 9/1989 | Petersen | 310/12.31 |
| 4,924,123 A | * | 5/1990 | Hamajima et al. | 310/15 |
| 5,124,598 A | * | 6/1992 | Kawamura | 310/30 |

(Continued)

FOREIGN PATENT DOCUMENTS

JP    10-313566 A    11/1998

(Continued)

OTHER PUBLICATIONS

AN899a.pdf : Microchip.com, motor control application note (2004).*

*Primary Examiner* — Quyen Leung
*Assistant Examiner* — John K Kim
(74) *Attorney, Agent, or Firm* — Westerman, Hattori, Daniels & Adrian, LLP

(57) ABSTRACT

The present invention provides a linear motor device that can reduce a variation in thrust caused by a variation in attractive force. The linear motor device includes a linear motor 1 and a control section 30 that controls the linear motor 1. The linear motor 1 includes a magnet member 2 composed of permanent magnets having respective N poles and S poles alternately arranged in an axial direction, and a coil member 3 which is located orthogonally to the axial direction with respect to the magnet member 2 and through which the magnet member 2 is movable in the axial direction relative to the coil member 3. The control section 30 controls current conducted through the coil member 3 so that a moving one of the magnet member 2 and the coil member 3 reciprocates within a use range L corresponding to a part of a pitch p between the magnetic poles N and S in the magnet member 2.

3 Claims, 5 Drawing Sheets

U.S. PATENT DOCUMENTS

| | | | | |
|---|---|---|---|---|
| 5,175,457 A | * | 12/1992 | Vincent | 310/15 |
| 5,325,699 A | * | 7/1994 | Stuart | 72/347 |
| 5,357,779 A | * | 10/1994 | Hahn et al. | 72/347 |
| 5,691,582 A | * | 11/1997 | Lucas et al. | 310/14 |
| 5,808,381 A | * | 9/1998 | Aoyama et al. | 310/12.29 |
| 5,872,407 A | * | 2/1999 | Kitaoka et al. | 310/12.14 |
| 6,363,750 B1 | * | 4/2002 | Chiodo | 65/108 |
| 6,397,635 B1 | * | 6/2002 | Sasso et al. | 65/160 |
| 6,701,748 B1 | * | 3/2004 | Hartman et al. | 65/29.18 |
| 7,242,118 B2 | * | 7/2007 | Sakamoto | 310/15 |
| 7,378,765 B2 | * | 5/2008 | Iwasa et al. | 310/14 |
| 7,482,717 B2 | * | 1/2009 | Hochhalter et al. | 310/12 |
| 7,633,189 B2 | * | 12/2009 | Iwasa et al. | 310/14 |
| 2002/0190582 A1 | * | 12/2002 | Denne | 310/14 |
| 2005/0023905 A1 | * | 2/2005 | Sakamoto | 310/12 |
| 2008/0041132 A1 | * | 2/2008 | Gombas | 72/450 |
| 2008/0079319 A1 | * | 4/2008 | Okada et al. | 310/12 |
| 2008/0185982 A1 | * | 8/2008 | Iwasa et al. | 318/135 |
| 2008/0246351 A1 | * | 10/2008 | Iwasa et al. | 310/14 |
| 2008/0246352 A1 | * | 10/2008 | Iwasa et al. | 310/14 |

FOREIGN PATENT DOCUMENTS

| | | | |
|---|---|---|---|
| JP | 2001-352747 A | | 12/2001 |

* cited by examiner

FIGURE 4A

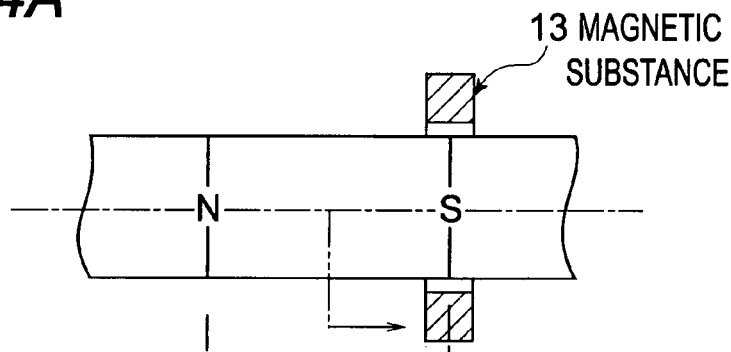

13 MAGNETIC SUBSTANCE

FIGURE 4B

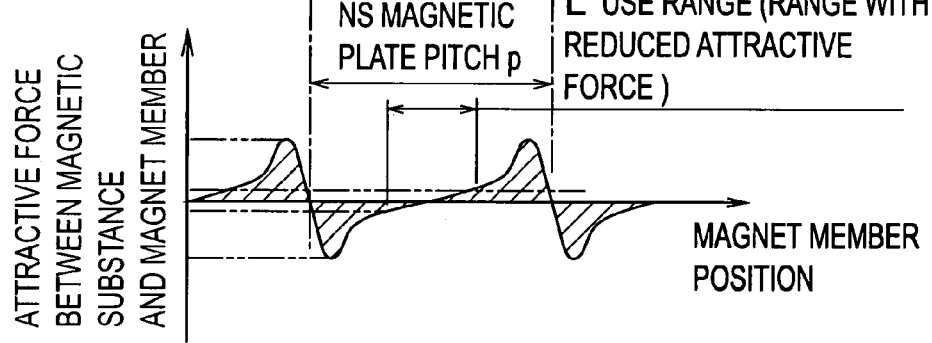

NS MAGNETIC PLATE PITCH p

L USE RANGE (RANGE WITH REDUCED ATTRACTIVE FORCE)

ATTRACTIVE FORCE BETWEEN MAGNETIC SUBSTANCE AND MAGNET MEMBER

MAGNET MEMBER POSITION

FIGURE 4C

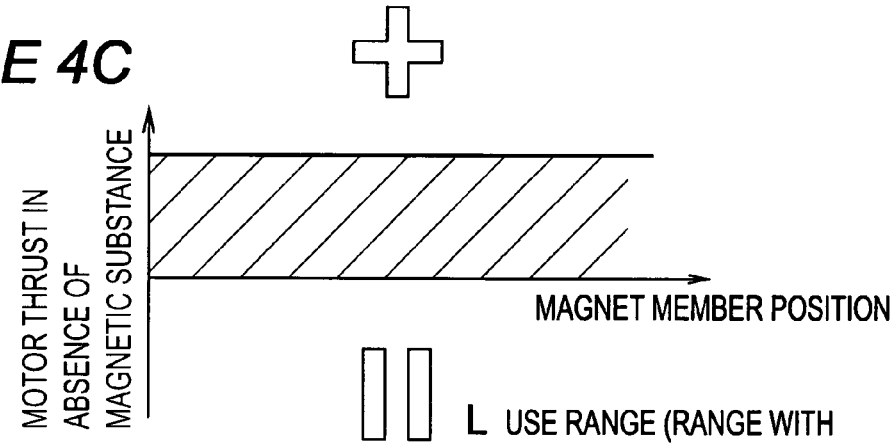

MOTOR THRUST IN ABSENCE OF MAGNETIC SUBSTANCE

MAGNET MEMBER POSITION

FIGURE 4D

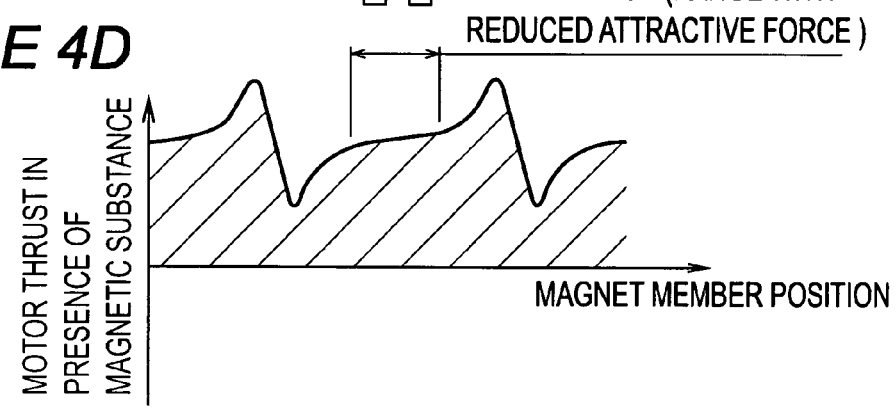

L USE RANGE (RANGE WITH REDUCED ATTRACTIVE FORCE)

MOTOR THRUST IN PRESENCE OF MAGNETIC SUBSTANCE

MAGNET MEMBER POSITION

THRUST VARIATION OBSERVED WHEN MAGNETIC SUBSTANCE IS PRESENT ON ROUTE

LINEAR MOTOR DEVICE AND MACHINE TOOL HAVING THE SAME MOUNTED THEREON

FIELD OF THE INVENTION

The present invention relates to a linear motor device and a machine tool such as a press machine in which the linear motor device is mounted.

BACKGROUND OF THE INVENTION

A conventionally proposed linear motor comprises a magnet member composed of round-shaft-like permanent magnets having alternately arranged respective N poles and S poles, and a coil member having a plurality of coils arranged in an axial direction so as to surround the periphery of the magnet member (for example, the Unexamined Japanese Patent Application Publication (Tokkai-Hei) No. 10-313566).

The linear motor disclosed in the Unexamined Japanese Patent Application Publication (Tokkai-Hei) No. 10-313566 is used, for example, in OA equipment or the like in place of a combination of a rotary motor and a ball screw. However, using the linear motor in a machine tool such as a press machine which makes direct-acting motion also results in a simple configuration and enhanced controllability.

However, while the linear motor is performing a direct-acting operation, where a magnetic substance is present around the outer periphery of a magnet member in a route of the linear motor, an attractive force varies at a period when the magnet member passes through each magnetic pole of the magnet member. This varies a resulting thrust. The magnetic substance may be provided, for example, in order to prevent the magnet member from falling down. Where the linear motor is used as a driving source for a machine tool such as a press machine, the variation in attractive force varies the speed of the contact between a workpiece and a tool. The variation in contact speed is reflected in the processing quality such as a press cut surface or a machining processing surface. Thus, the processing quality is degraded.

An object of the present invention is to provide a linear motor device that can reduce a variation in thrust caused by a variation in attractive force. Another object of the present invention is to provide a machine tool such as a press machine which can reduce the degradation of the processing quality caused by the variation in attractive force, while using the linear motor as a driving source for simplification.

SUMMARY OF THE INVENTION

A linear motor device in accordance with the present invention comprises a linear motor and a control section that controls the linear motor. The linear motor comprises a magnet member composed of permanent magnets having respective N poles and S poles alternately arranged in an axial direction, and a coil member which is located orthogonally to the axial direction with respect to the magnet member and through which the magnet member is movable in the axial direction relative to the coil member. The control section controls current conducted through the coil member so that a moving one of the magnet member and the coil member reciprocates within a part of a range between magnetic poles in the magnet member. The term "a part" as used herein means "not all" and may refer to, for example, most of the range between the magnetic poles in the magnet member. With this configuration, the control section controls the current conducted through the coil member so that the moving one of the magnet member and the coil member reciprocates within the part of the range between the magnetic poles in the magnet member. Consequently, the linear motor reciprocates within the range in which the attractive force does not vary significantly. This reduces a variation in thrust caused by a variation in attractive force.

A machine tool in accordance with the present invention comprises processing means for processing a workpiece and a drive means for reciprocating the processing means. The drive means comprises a linear motor and a control section that controls the linear motor. The linear motor comprises a magnet member composed of permanent magnets having respective N poles and S poles alternately arranged in an axial direction, and a coil member which is located orthogonally to the axial direction with respect to the magnet member and through which the magnet member is movable in the axial direction relative to the coil member. The control section controls current conducted through the coil member so that a moving one of the magnet member and the coil member which is combined to the processing means reciprocates within a part of a range between the magnetic poles in the magnet member. This configuration uses the linear motor as drive means for reciprocating the processing means. Thus, unlike the use of a rotary motor, the use of the linear motor eliminates the need for a mechanism that converts rotation into a reciprocating operation, simplifying the configuration. Further, the control section performs control such that the linear motor performs a reciprocating operation within the range in which the attractive force does not vary significantly. This reduces a variation in thrust caused by a variation in attractive force. This in turn makes it possible to avoid the degradation of processing quality associated with the variation in attractive force, allowing the processing quality to be improved.

The machine tool may be a press machine. That is, a press machine in accordance with the present invention comprises a press processing means for executing processing such as punching or forming on a plate material and drive means for driving the press processing means. The drive means comprises a linear motor and a control section that controls the linear motor. The linear motor comprises a magnet member composed of permanent magnets having respective N poles and S poles alternately arranged in an axial direction, and a coil member which is located orthogonally to the axial direction with respect to the magnet member and through which the magnet member is movable in the axial direction relative to the coil member. The control section controls current conducted through the coil member so that a moving one of the magnet member and the coil member which is combined to the press processing means reciprocates within a part of a range between the magnetic poles in the magnet member. This configuration uses the linear motor as a drive means for reciprocating the press processing means. Thus, unlike the use of a rotary motor, the use of the linear motor eliminates the need for a mechanism that converts rotation into a reciprocating operation, simplifying the configuration. Further, the control section performs control such that the linear motor performs a reciprocating operation within the range in which the attractive force does not vary significantly. This reduces a variation in thrust caused by a variation in attractive force. This in turn makes it possible to avoid the degradation of the processing quality associated with the variation in attractive force, allowing the processing quality to be improved.

The linear motor device in accordance with the present invention comprises the linear motor and the control section that controls the linear motor. The linear motor comprises the magnet member composed of the permanent magnets having the respective N poles and S poles alternately arranged in the axial direction, and the coil member which is located orthogonally to the axial direction with respect to the magnet member and through which the magnet member is movable in the axial direction relative to the coil member. The control section controls the current conducted through the coil member so that the moving one of the magnet member and the coil member reciprocates within the part of the range between the magnetic poles in the magnet member. This reduces the variation in thrust caused by the variation in attractive force.

The machine tool in accordance with the present invention comprises the processing means for processing the workpiece and the drive means for reciprocating the processing means. The drive means comprises the linear motor and the control section that controls the linear motor. The linear motor comprises the magnet member composed of the permanent magnets having the respective N poles and S poles alternately arranged in the axial direction, and the coil member which is located orthogonally to the axial direction with respect to the magnet member and through which the magnet member is movable in the axial direction relative to the coil member. The control section controls the current conducted through the coil member so that the moving one of the magnet member and the coil member which is combined to the processing means reciprocates within the part of the range between the magnetic poles in the magnet member. This configuration can reduce the degradation of the processing quality caused by the variation in attractive force, while using the linear motor as a driving source for simplification.

The press machine in accordance with the present invention comprises the press processing means for executing processing such as punching or forming on the plate material and the drive means for driving the press processing means. The drive means comprises the linear motor and the control section that controls the linear motor. The linear motor comprises the magnet member composed of the permanent magnets having the respective N poles and S poles alternately arranged in the axial direction, and the coil member which is located orthogonally to the axial direction with respect to the magnet member and through which the magnet member is movable in the axial direction relative to the coil member. The control section controls the current conducted through the coil member so that the moving one of the magnet member and the coil member which is combined to the press processing means reciprocates within the part of the range between the magnetic poles in the magnet member. This configuration can reduce the degradation of the processing quality caused by the variation in attractive force.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4 is a diagram illustrating a variation in thrust which may occur when the linear motor has a magnetic substance.

DETAILED DESCRIPTION OF THE PREFERRED EMBODIMENTS

An embodiment of the present invention will be described with reference to the drawings.

The present linear motor device comprises a linear motor 1 and a control section 30 that controls the linear motor 1.

Figure 1:
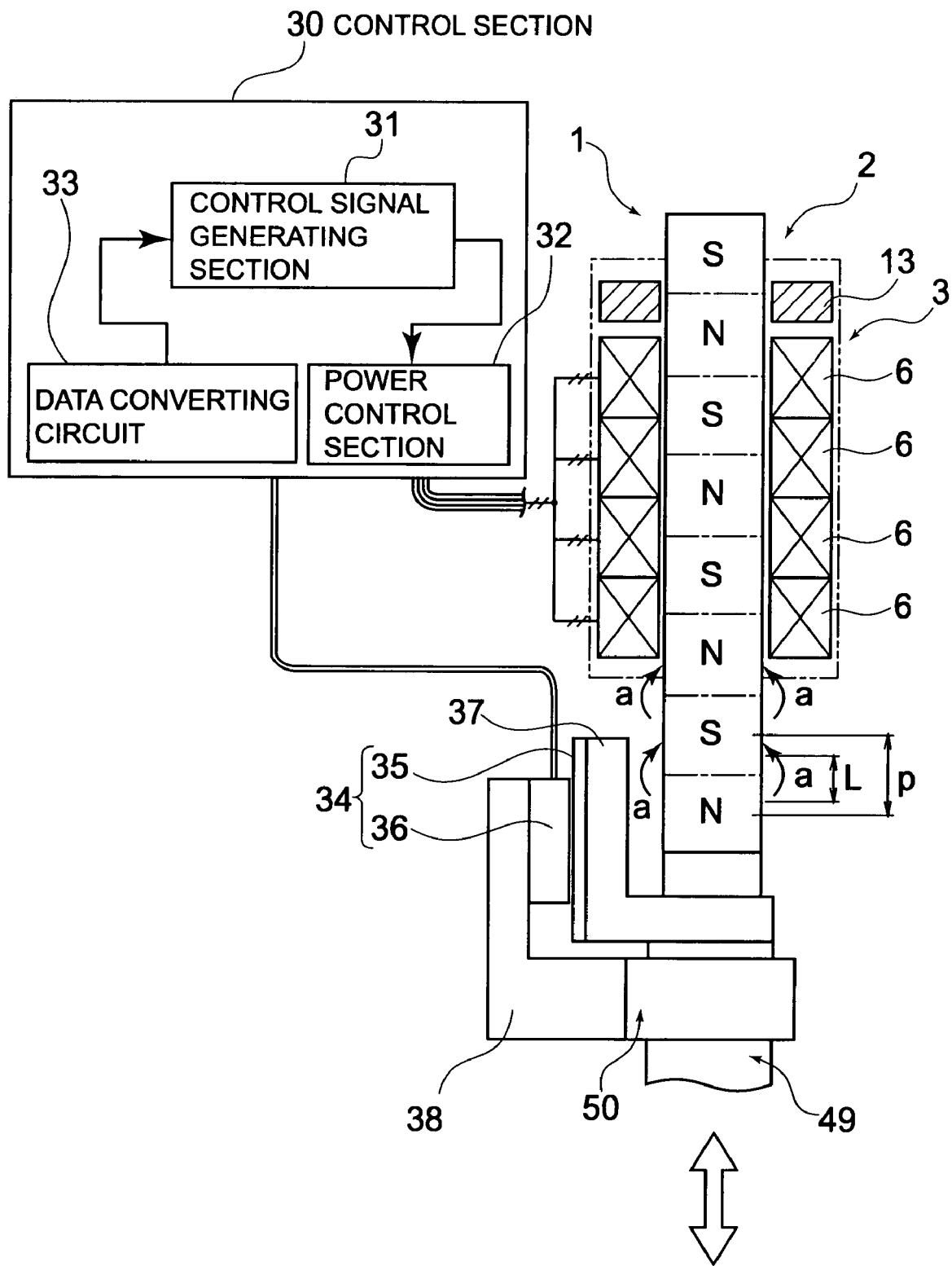
FIG. 1 is a block diagram showing the conceptual configuration of a linear motor device in accordance with an embodiment of the present invention.

The linear motor 1 comprises a magnet member 2 composed of permanent magnets having respective N poles and S poles alternately arranged in an axial direction, and a coil member 3 which is located orthogonally to the axial direction with respect to the magnet member 2 and through which the magnet member 2 is movable in the axial direction relative to the coil member 3. Either the magnet member 2 or the coil member 3 may be a moving side. In the present embodiment, the magnet member 2 is a moving-side member, and the coil member 3 is a fixed-side member. The magnet member 2 is a round bar-like member. A magnetic flux (a) is generated between the adjacent magnetic poles N and S as shown by arrow a in FIG. 1. The coil member 3 is configured as a coil unit having a plurality of cylindrical coils 6 arranged in the axial direction so as to surround the periphery of the magnet member 2. The coils 6 are connected together in parallel.

The coil member 3 has a magnetic substance 13 provided, for example, at one end thereof to allow the magnet member 2 to exert a magnetic attractive force. The magnetic substance 13 is provided, for example, in order to inhibit the magnet member 2 from falling down or hold the position of the magnet member 2 when a power supply to the coil member 3 is turned off.

The control section 30 controls current conducted through the coils 6 of the coil member 3 so that the magnet member 2 reciprocates within a use range L corresponding to a part of a pitch (p) between the magnetic poles N and S in the magnet member 2. The control section 30 is composed of a power control section 32 that outputs a driving current exciting each of the coils 6 of the coil member 3, a control signal generating section 31 that outputs control signals allowing the power control section 32 to switch between a state in which the driving current is output and a state in which the driving current is stopped, and to switch a current flowing direction, and a data converting circuit 33 which converts a signal from a position detector 34 detecting the forward or backward position of the magnet member 2 and which then inputs the resulting signal to the control signal generating section 31.

The power control section 32 outputs a three-phase alternating current or the like as the driving current. The power control section 32 comprises an inverter circuit that converts a three-phase commercial alternating current power supply into an output of a predetermined frequency. With the linear motor 1, the power control section 32 maintains the output of the driving current to excite the coils 6 to continuously move the magnet member 2 in a given direction.

The position detector 34 is composed of a linear scale 35 extending in the axial direction of the magnet member 2 and a detection head 36 that reads the linear scale 35. The linear scale 35 is mounted to the magnet member 2 via a scale mounting part 37. The detection head 35 is mounted, via a detection head mounting part 38, to a member to which the coil member 3 is fixed or to the coil member 3. In the present embodiment, the detection head mounting part 38 is mounted to a ram guide 50 that guides a ram 49 of a press machine shown below in FIG. 5. The data converting circuit 33 is a circuit that converts an output from the detection head 36 of the position detector 34 into a position signal that can be handled by the control signal generating section 31. For example, where the position detector 34 is of an incremental type that outputs a pulse equivalent to a travel distance, from the detection head 36, the data converting circuit 33 converts the pulse into position data of a digital value.

Where the output from the position detector 34 is an output in a format that can be handled directly by the control signal generating section 31, the data converting circuit 33 is unnecessary.

For the control signal generating section 31, a predetermined use range L is set which corresponds to a part of the pitch (p) between the magnetic poles N and S in the magnet member 2. The control signal generating section 31 has a function of monitoring the position of the magnet member 2 obtained from the position detector 34 and performing control such that the magnet member 2 does not move out of the predetermined moving range during reciprocating motion. For example, when the position of the magnet member 2 reaches one end of the predetermined use range L, the function outputs a control signal that changes the direction of a current controlled by the power control section 32 so that the magnet member 2 moves in the reverse direction. The predetermined use range L can be optionally set.

Further, in accordance with an output from control means (not shown in the drawings) exterior to the linear motor device, for example, a control device for a machine tool having the linear motor device mounted thereon, the control signal generating section 31 outputs a control signal that allows the power control section 32 to start or stop the supply of a current. For example, in accordance with the output from the external control means, the control signal generating section 31 can perform control such that the magnet member 2 reciprocates further within a part of the use range L. To prevent the magnet member 2 from falling down or to hold the position of the magnet member 2, the control signal generating section 31 outputs a control signal so as to move the magnet member 2 out of the use range L to a position where attractive forces are balanced. The control signal generating section 31 may perform, in a reciprocation mode, simple control such that the magnet member 2 will not move out of the use range L, with the operation range of the reciprocation set by the external control means. Further, in accordance with an instruction given by the external control means and ordering that the reciprocation mode be canceled, the control signal generating section 31 may allow the external means to move the magnet member 2 to move out of the use range.

Figure 2:
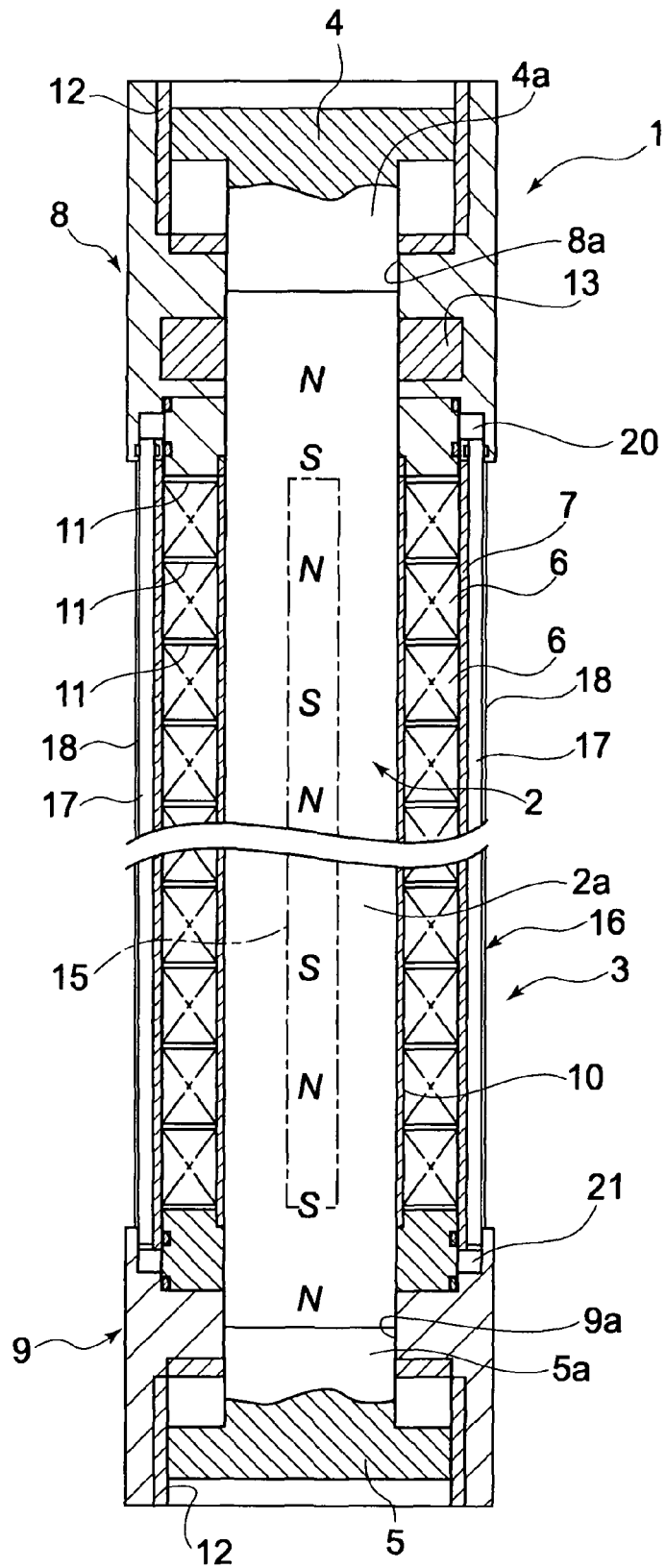
FIG. 2 is a vertical sectional view of a specific example of the linear motor.
Figure 3:
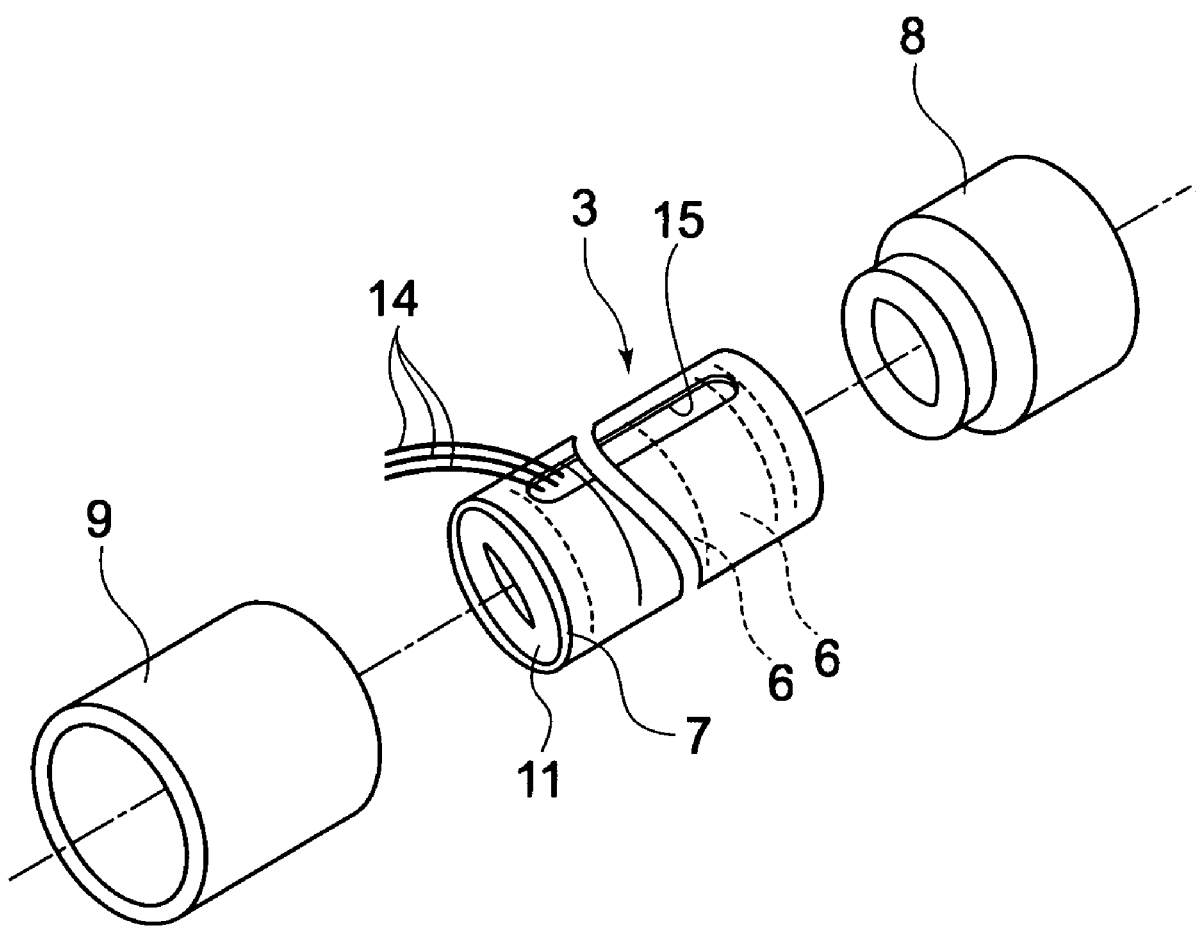
FIG. 3 is an exploded perspective view of a coil member of the linear motor.

FIG. 2 and FIG. 3 show a specific example of the linear motor 1. The magnet member 2 comprises a magnet member main body 2a composed of a round bar-like permanent magnet, and sliders 4, 5 mounted at the opposite ends of the magnet member main body 2a.

The coil member 3 is constructed by placing the plurality of coils 6 in a common cylindrical coil case 7 and mounting caps 8, 9 to the respective ends of the coil case 7. Ring-like radiator plates 11 are each interposed between the coils 6. The radiator plates 11 are also arranged at the opposite ends of the arrangement of the coils 6. The radiator plates 11 are in contact with an inner peripheral surface of the coil case 7. The coils 6 are located around the outer periphery of a common cylindrical coil bobbin 10. The plurality of coils 6 are molded inside the coil case 7 together with the radiator plates 11 for integration. Wires 14 (see FIG. 3) connecting the plurality of coils 6 together are taken out through a connecting opening 15 formed in the coil case 7.

As shown in FIG. 2, a cylindrical bush 12 is provided inside the inner periphery of each of the caps 8, 9 attached to the respective ends of the coil case 7; the cylindrical bushes 12 serve as sliding bearings that are slidably fitted around respective sliders 4, 5 attached to the corresponding ends of the magnet member 2. The caps 8, 9 are shaped like cylinders each having a stepped inner peripheral surface. The sliders 4, 5 are shaped like shafts each having a stepped outer peripheral surface. The bush 12 is provided inside a larger-diameter-side inner peripheral surface of each of the caps 8, 9. The bush 12 holds a very small gap that allows the magnet member 2 and the coil member 3 to move relative to each other. That is, the very small gap for axial movement is held between the an inner peripheral surface of the coil bobbin 10 for the coils 6 and an outer peripheral surface of the magnet member 2, and between each of the outer peripheral surfaces of smaller diameter portions 4a, 5a of the sliders 4, 5 attached to the opposite ends of the magnet member 2 and a corresponding one of the smaller-diameter-side inner peripheral surfaces 8a, 9a of the caps 8, 9. The means for holding the gap between the magnet member 2 and the coil member 3 need not necessarily comprise any linear motor. Equipment utilizing the linear motor may have the gap holding means.

The coil member 3 has the magnetic substance 13 located at an end of the arrangement of the coils 6 to allow the magnet member 2 to exert a magnetic attractive force to inhibit the magnet member 2 from falling down. The magnetic substance 13 is shaped like a ring having an inner diameter allowing the magnetic substance 13 to be loosely fitted around the outer periphery of the magnet member 2. The magnetic substance 13 is composed of iron or another ferromagnetic substance. In the present embodiment, the magnetic substance 13 is embedded around the inner peripheral surface of the upper cap 8. The axial position of the magnetic substance 13 is such that even though, for example, the magnet member 2 moves relative to the coil member 3, the magnetic substance 13 is always located around the periphery of the magnet member 2.

A forcible cooling section 16 is provided around the outer periphery of the coil case 7. The forcible cooling section 16 is composed of a plurality of cooling pipes 17 arranged at equal intervals in a circumferential direction and each extending in the axial direction. The opposite ends of each cooling pipe 17 are in communication with annular aggregate paths 20, 21 provided in the respective caps 8, 9 at the opposite ends of the coil case 7. The aggregate paths 20, 21 are connected to circulation devices (not shown in the drawings) for a cooling liquid.

According to the linear motor device configured as described above, the control section 30 controls the direction of power conducted through the coils 6 so that the magnet member 2, which is a moving member, reciprocates within the use range L, corresponding to the part of the pitch (p) between the magnetic poles N and S in the magnet member 2. That is, the control signal control section 31 of the control section 30 monitors the output from the position detector 34 and outputs the control signal instructing the magnet member 2 to move within the use range L during reciprocation. To prevent fall-down of the magnet member 2 or to hold the position thereof, the control signal control section 31 outputs the control signal such that the magnet member 2 moves to the position where the attractive force of the magnetic substance 13 is balanced with the attractive force of the magnet member 2.

Thus, the magnet member 2 reciprocates within the use range L, corresponding to the part of the pitch (p) between the magnetic poles N and S. Consequently, even with the magnetic substance 13, which allows a magnetic force to act on the magnet member 2, the magnet member 2 of the linear motor 1 reciprocates within the range in which the attractive force does not vary significantly. This reduces a variation in thrust caused by a variation in attractive force.

The reduction in variation will be described with reference to FIG. 4. Without the magnetic substance 13, the attractive force, corresponding to the thrust of the linear motor 1, is fixed regardless of the forward or backward position of the magnet member 2 as shown in FIG. 4C. However, with the magnetic substance 13, as shown in FIG. 4B, an attractive force acts between the magnetic substance 13 and the magnet member 2. The attractive force varies at the period of the pitch (p) between the magnetic poles depending on the position in the magnet member 2. Therefore, with the magnetic substance 13, the attractive force, corresponding to the thrust of the linear motor 1, has a value equal to the sum of the forces shown in FIG. 4B and FIG. 4C. That is, the attractive force has a value varying at the magnetic pole pitch (p) as shown in FIG. 4D. The variation in attractive force increases in the vicinity of a position where the magnetic substance 13 is located at any of the magnetic poles. Thus, the use range L is set to correspond to a range in the center of the magnetic pole pitch (p) within which the attractive force varies relatively insignificantly. Further, the magnet member 2 is driven so as to move forward and backward within the use range L. This reduces the variation in the thrust of the linear motor 1 caused by the variation in attractive force. The use range L may be appropriately set.

Figure 5:
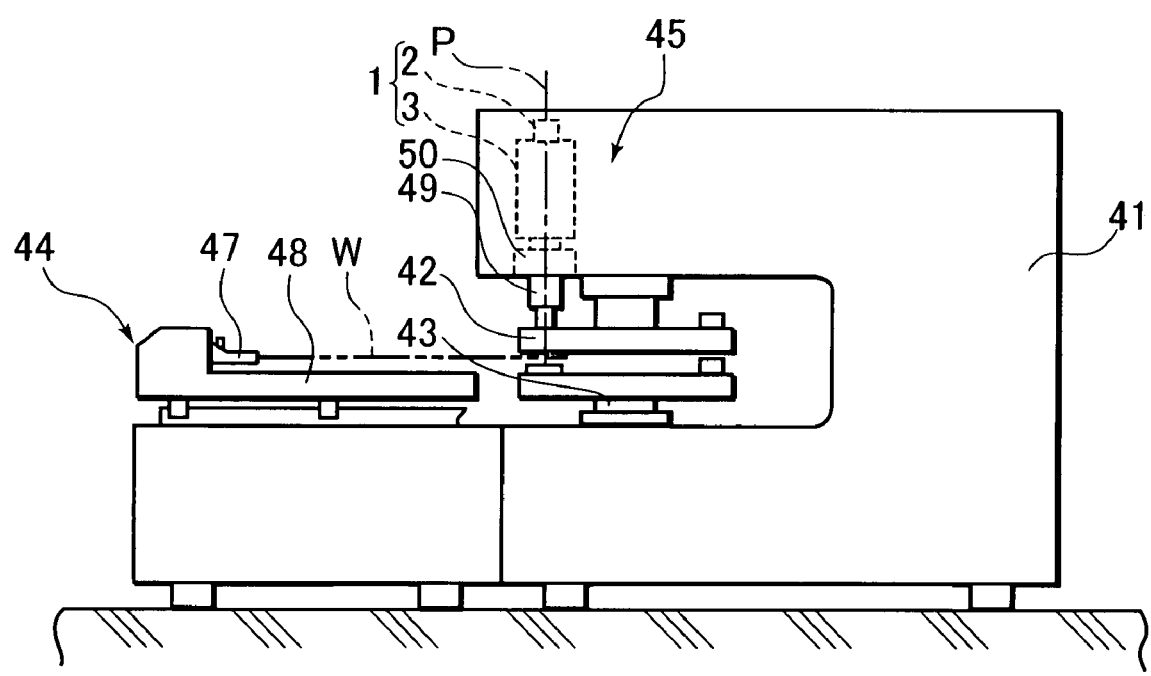
FIG. 5 is a side view of a press machine that is a machine tool using the linear motor in accordance with an embodiment of the present invention.

FIG. 5 shows a press machine that is an example of a machine tool having a linear motor device mounted thereon and using the linear motor as a driving source. The press machine has tool supports 42, 43 and a workpiece feeding mechanism 44 installed in a lower part of a frame 41, and the linear motor device installed in an upper part of the frame 41 as drive means for allowing press processing means 45 to perform a reciprocating operation; the linear motor device is composed of the linear motor 1 and the control section 30 in accordance with the first embodiment.

The tool supports 42, 43 are composed of an upper turret and a lower turret, respectively, which are concentrically installed. Punch tools and die tools are mounted on the upper tool support 42 and the lower tool support 43, respectively, at a plurality of positions in a circumferential direction. The tool supports 42, 43 are rotated to index any of the punch tools and die tools to a predetermined punch position P. The workpiece feeding mechanism 44 uses a work holder 47 to grip an edge of a plate-like workpiece W and moves the workpiece forward, backward, rightward, or leftward on a table 48.

The press processing means 45 supports a ram 49 elevating and lowering the punch tool indexed to the punch position P on the tool support 42 so that the ram 49 can be freely elevated and lowered by a ram guide 50. The press mechanism 45 thus drivingly elevates and lowers the ram 49 by means of the linear motor 1. The coil member 3 of the linear motor 1 is fixed to the frame 41. The magnet member 2 of the linear motor 1 is fixed to the ram 49, which is a movable portion.

The press machine configured as described above uses the linear motor 1 as drive means for the press processing means 45. Thus, the press machine eliminates the need for a mechanism converting rotation into the rectilinear motion of the ram 49 compared to a press machine using a rotary motor. The press mechanism 45 thus has a reduced number of parts and thus a simplified configuration. The present press machine also eliminates the need for a hydraulic unit compared to a press machine using a hydraulic cylinder as a press driving source. This simplifies the configuration. Furthermore, the linear motor 1 has a high positional accuracy, enabling processing with improved quality and accuracy.

Further, in the linear motor 1, used in the press machine in accordance with the embodiment, the control section 30 performs control such that the magnet member 2 reciprocates within the use range L, corresponding to the part of the pitch (p) between the magnetic poles N and S in the magnet member 2 as described above. The magnet member 2 thus reciprocates within the range in which the attractive force does not vary significantly. This reduces the variation in thrust caused by the variation in attractive force, thus reducing the degradation of press processing quality caused by the variation in attractive force.

The linear motor device in accordance with the present invention is not limited to a ring-shaped type in which the coil member 3 surrounds the magnet member 2. In the linear motor device, for example, the magnet member 2 may be located parallel to the coil member. Further, the machine tool having the linear motor device mounted thereon in accordance with the present invention is not limited to the press machine. The present invention is applicable to machine tools in general comprising processing means for processing a workpiece and drive means for reciprocating the processing means, wherein the linear motor device in accordance with the present invention is used as the drive means. Moreover, the linear motor device in accordance with the present invention can be used as a driving source not only for machine tools but also for various types of equipment.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

The invention claimed is:

1. A linear motor device, comprising:
   a linear motor and a control section that controls the linear motor, the linear motor comprising a magnet member composed of permanent magnets having respective N poles and S poles alternately arranged in an axial direction, and
   a coil member which is located orthogonally to said axial direction with respect to the magnet member and through which said magnet member is movable in the axial direction relative to the coil member, said control section controlling current conducted through said coil member so as to move said magnet member relative to said coil member by reciprocating said magnet member within a use range,
   said use range corresponds to a range in an intermediate portion of a magnetic pole pitch where said magnetic pole pitch is a range between magnetic poles in each of the permanent magnets, wherein the attractive force in said range in said intermediate portion varies insignificantly relative to the attractive force in a vicinity of the magnetic poles of each of the permanent magnets which increases in variation
   wherein the attractive force in said range in said intermediate portion varies insignificantly relative to the attractive force, which increases in variation in a vicinity of the magnetic poles of the magnetic member.

2. A machine tool having a linear motor device mounted thereon, comprising:
   processing means for processing a workpiece and a drive means for reciprocating the processing means, said machine tool being characterized in that said drive means comprises a linear motor and a control section that controls the linear motor, and said linear motor comprises a magnet member composed of permanent magnets having respective N poles and S poles alternately arranged in an axial direction, and a coil member which is located orthogonally to said axial direction with respect to the magnet member and through which said magnet member is movable in the axial direction relative to the coil member, and in that said control section controls current conducted through said coil member so as to move said magnet member relative to said coil member, which is combined to said processing means, by reciprocating said magnet member within a use range, said use range corresponds to a range in an intermediate portion of a magnetic pole pitch where said magnetic pole pitch is a range between magnetic poles in the magnet member, wherein the attractive force in said range in said intermediate portion varies insignificantly relative to the attractive force, which increases in variation in a vicinity of the magnetic poles of the magnetic member.

3. A press machine having a linear motor device mounted thereon, comprising:

a press processing means for executing processing so as to punch or form on a plate material and a drive means for driving the press processing means, said press machine being characterized in that said drive means comprises a linear motor and a control section that controls the linear motor, and said linear motor comprises a magnet member composed of permanent magnets having respective N poles and S poles alternately arranged in an axial direction, and a coil member which is located orthogonally to said axial direction with respect to the magnet member and through which said magnet member is movable in the axial direction relative to the coil member, and in that said control section controls current conducted through said coil member so as to move said magnet member relative to said coil member, which is combined to said press processing means, by reciprocating said magnet member within a use range, said use range corresponds to a range in an intermediate portion of a magnetic pole pitch where said magnetic pole pitch is a range between magnetic poles in the magnet member, wherein the attractive force in said range in said intermediate portion varies insignificantly relative to the attractive force, which increases in variation in a vicinity of the magnetic poles of the magnetic member.

* * * * *